US012427685B2

(12) United States Patent
Oberle

(10) Patent No.: US 12,427,685 B2
(45) Date of Patent: Sep. 30, 2025

(54) WHETTING DEVICE FOR A SLICER COMPRISING A POSITIONING AID

(71) Applicant: Bizerba SE & Co. KG, Balingen (DE)

(72) Inventor: Marius Oberle, Balingen (DE)

(73) Assignee: BIZERBA SE & CO. KG, Balingen (DE)

( * ) Notice: Subject to any disclaimer, the term of this patent is extended or adjusted under 35 U.S.C. 154(b) by 0 days.

(21) Appl. No.: 17/834,984

(22) Filed: Jun. 8, 2022

(65) Prior Publication Data

US 2022/0402156 A1 Dec. 22, 2022

(30) Foreign Application Priority Data

Jun. 16, 2021 (EP) .................................... 21179803

(51) Int. Cl.
*B26D 7/12* (2006.01)
*B26D 7/06* (2006.01)
*B26D 7/22* (2006.01)

(52) U.S. Cl.
CPC ............ *B26D 7/12* (2013.01); *B26D 7/0616* (2013.01); *B26D 7/225* (2013.01)

(58) Field of Classification Search
CPC .. B24B 3/463; B24B 3/46; B26D 7/12; B26D 7/0616; B26D 2210/02; B23D 63/14; B23D 63/123; B23D 63/105
See application file for complete search history.

(56) References Cited

U.S. PATENT DOCUMENTS

| | | | | |
|---|---|---|---|---|
| 512,858 A * | 1/1894 | Bland | F16H 1/006 | 74/504 |
| 1,263,414 A * | 4/1918 | Hopkinson et al. | B26D 7/225 | 451/422 |
| 1,948,811 A * | 2/1934 | Berkel | B24B 3/463 | 451/422 |
| 2,598,740 A * | 6/1952 | Zimmermann | B26D 7/12 | 83/717 |
| 2,715,305 A * | 8/1955 | Brown | B24B 3/463 | 451/422 |
| 2,978,848 A * | 4/1961 | Raine | B24B 3/463 | 76/85 |
| 3,986,304 A | 10/1976 | Shie, III | | |

(Continued)

FOREIGN PATENT DOCUMENTS

| | | |
|---|---|---|
| DE | 19907028 A1 | 7/2000 |
| DE | 10300972 A1 | 7/2004 |

(Continued)

*Primary Examiner* — Jennifer S Matthews
(74) *Attorney, Agent, or Firm* — LEYDIG, VOIT & MAYER, LTD.

(57) ABSTRACT

A whetting device is for a slicer. The whetting device has: a whetstone that sharpens a circular blade of the slicer; a hone that deburrs the circular blade; a handle that moves the whetstone or the hone toward the circular blade; and a mount for fastening to a stop plate of the slicer. The mount has an insertion apparatus for being form-fittingly inserted into the stop plate. The mount having a U-shaped plate receptacle, which has a gap for introducing the stop plate into the gap in when the whetting device is pushed onto the stop plate. The insertion apparatus has a lug for engaging in an recess in the stop plate, or the stop plate has the lug for engaging in the recess in the insertion apparatus.

20 Claims, 12 Drawing Sheets

(56) References Cited

U.S. PATENT DOCUMENTS

| | | | | |
|---|---|---|---|---|
| 7,134,937 | B1 | 11/2006 | Chen et al. | |
| 2007/0049181 | A1 * | 3/2007 | Zeeb | B24B 3/463 451/420 |
| 2012/0152201 | A1 * | 6/2012 | Salameh | F16B 5/0664 123/198 E |
| 2014/0127982 | A1 * | 5/2014 | Scattolin | B24B 3/368 451/420 |
| 2015/0078815 | A1 * | 3/2015 | Ge | F16B 7/042 403/376 |

FOREIGN PATENT DOCUMENTS

| | | | | |
|---|---|---|---|---|
| EP | 0972619 | A2 | * | 1/2000 |
| EP | 1922189 | B1 | | 11/2011 |
| FR | 741648 | A | * | 2/1933 |
| GB | 178913 | A | | 4/1922 |
| GB | 457379 | A | | 11/1936 |
| WO | WO 2020185153 | A1 | | 9/2020 |

* cited by examiner

WHETTING DEVICE FOR A SLICER COMPRISING A POSITIONING AID

CROSS REFERENCE TO RELATED APPLICATIONS

This application claims benefit to European Patent Application No. 21 179 803.8, filed on Jun. 16, 2021, which is hereby incorporated by reference herein.

FIELD

The present disclosure relates to a whetting device for a slicer for slicing off slices from in particular a length of material to be sliced, having a positioning aid.

BACKGROUND

U.S. Pat. No. 7,134,937 B1 (=reference [1]) relates to a slicing machine for food products, comprising a rotatable slicing blade. The slicing machine comprises a whetting instrument and an associated blade guard assembly having a guard element which is positioned on a blade guard ring such as to protect the cutting edge of the blade when the whetting instrument is in its stand-by or non-sharpening state. During whetting, a part of the blade guard ring is opened in order for the whetting instrument to be able to touch the cutting edge of the blade.

EP 1 922 189 B1 (=reference [2]) relates to a food slicing unit comprising a rotating slicing blade and a sharpening mechanism for sharpening the slicing blade, the sharpening mechanism being releasably fastened to a portion of a product table in order to move together with the product table and provide sharpening of the slicing blade. The sharpening mechanism has a rotating sharpening element and a deburring element, the sharpening element and the deburring element being mounted independently of one another. The sharpening mechanism is detachably fastened in a cavity formed in a bottom portion of the food product table facing the blade.

To ensure operationally reliable functioning of the whetting device and a satisfactory whetting operation, the whetstone and the hone are aligned with the circular blade at very low tolerances. For this reason, the whetting device is able to be fitted on the slicer with low tolerances in relation to the circular blade.

Because components, such as the blade guard ring and carriage, do not satisfy these tolerance specifications, in order to ensure the whetstone and the hone are positioned properly geometrically in relation to the circular blade of the slicer, all the whetting devices known to the inventors have to be adjusted to and aligned with the slicer during production. Hitherto, this adjustment had to be carried out during production, for example via slots. A whetting device is thus always allocated to one specific, individual slicing machine. Particularly when the whetting device has to be fastened to a blade guard ring or uses the blade guard ring as a stop for the mounted position, a whetting device has to be allocated to a specific slicer since the blade guard ring is generally arranged on the slicer only within a rough geometric tolerance in relation to the circular blade. In this case, allocation to a very specific slicer is necessary; allocating a whetting device to a slicer of a particular type is insufficient in this regard.

Therefore, without first being re-adjusted, a whetting device for a slicer of a particular type cannot ever be used immediately for a different slicer, even if the other slicer is exactly the same type as the first.

SUMMARY

In an embodiment, the present disclosure provides a whetting device that is for a slicer for slicing off slices from a length of material to be sliced. The whetting device has: a whetstone configured to sharpen a rotating circular blade of the slicer; a hone configured to deburr the circular blade; a handle configured to move the whetstone or the hone toward the circular blade; and a mount configured to be fastened to a stop plate of the slicer, the mount having an insertion apparatus configured to be form-fittingly inserted into the stop plate, the mount having a U-shaped plate receptacle, which has a gap for introducing the stop plate into the gap in a state where the whetting device is pushed onto the stop plate. The insertion apparatus has at least one lug configured to engage in an associated recess in the stop plate, or the stop plate has the at least one lug configured to engage in an associated recess in the insertion apparatus.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1A:
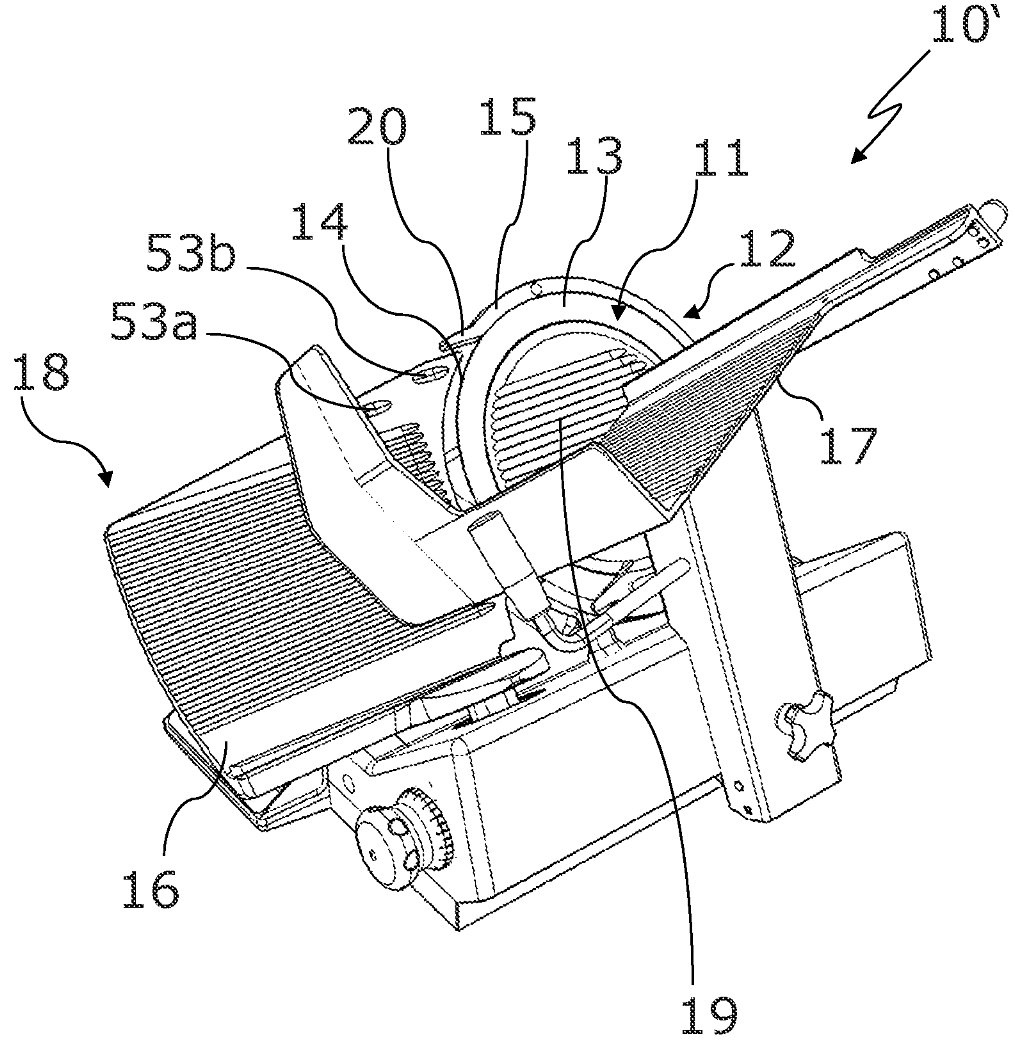
FIG. 1*a* is a three-dimensional view of a slicer configured as a gravity feed slicing machine.

The present disclosure relates to a whetting device for a slicer for slicing off slices from in particular a length of material to be sliced, preferably food, the whetting device having a whetstone for sharpening a rotating circular blade of the slicer, and a hone for deburring the circular blade, the whetting device having a handle for moving the whetstone and/or the hone toward the circular blade. Furthermore, the present disclosure relates to a slicing system comprising a whetting device of this kind and a slicer.

Aspects of the present disclosure addresses the problem, which is relatively challenging when considered in detail, of providing a whetting device for whetting a circular blade that, owing to the way in which it is positioned on a slicer, can be used in a simple manner for many different slicers of the same type without any additional complex adjustment before the actual whetting operation. Another problem addressed by aspects of the present disclosure is to provide a slicing system comprising a whetting device of this kind and a slicer.

Aspects of the present disclosure solve this problem in both a surprisingly simple and also effective way in that a whetting device has a mount for being fastened to a stop plate of the slicer, the mount having an insertion apparatus for being form-fittingly inserted into the stop plate, the mount having a U-shaped plate receptacle which has a gap for introducing the stop plate into the gap when the whetting device is pushed onto the stop plate, and in that the insertion apparatus has at least one lug, preferably two lugs, for engaging in an associated recess in the stop plate or in that the stop plate has at least one lug, preferably two lugs, for engaging in an associated recess in the insertion apparatus.

The severe restrictions, which have always applied up to now, whereby a whetting device could only be used on one specific slicer allocated to the whetting device are thus overcome.

The lugs are secured by being inserted into the recesses, the recesses thereby in particular forming form-fitting receptacles for the lugs. Once inserted into the recesses, the lugs prevent the whetting device from being displaced along the stop plate. By way of the lugs and the associated recesses, the whetting instrument is oriented on the stop plate.

In general, the stop plate is aligned with the circular blade to a relatively high degree of accuracy during production of the slicer, this positioning being the same for many different slicers, in particular for those of the same type. In the process, the stop plate is generally fastened to the slicer housing using slots and is thus adjusted to the circular blade. Due to the accurate positioning of the stop plate, the position of the stop plate has no or relatively low tolerances relative to the circular blade, and in particular is the same in many different slicers, even when the type varies slightly. Owing to the precise positioning of the whetting device on the stop plate, the positioning being determined by the lugs and the associated recesses, the whetting device can be fitted on each of the slicers at sufficiently low tolerances, without the need for any precise re-adjustment. As a result, due to its accurate positioning relative to the slicing blade, a single whetting device can be used for whetting the blade of different slicers immediately after being mounted. In other words, this has the favorable effect whereby adjustment during the production of a whetting device for a first slicer of a particular type simultaneously also includes adjustment of the whetting device for a second slicer of the same type. The whetting device can thus be used for a plurality of slicers of the same or a similar type, without having to be re-adjusted again and again.

Particularly, in embodiments of the slicer in which the stop plate thereof can move relative to the circular blade in a direction of the axis of rotation of the circular blade, the whetting device can be fastened to the stop plate by means of the mount or detached from the stop plate when the distance between the stop plate and the blade guard ring is shorter than a predetermined distance in the direction of the axis of rotation of the circular blade, i.e., in particular when the stop plate is in a closed position. The whetting device can then be aligned to a high degree of precision in different slicers by moving the stop plate relative to the circular blade. In the process, as a result of being moved, the stop plate switches into an open position.

The slicer can in particular be configured as a vertical slicing machine or a gravity feed slicing machine.

In a first step, the whetstone of the whetting device touches the cutting edge from one side and thus sharpens the cutting edge. In a second step, the hone of the whetting device touches the cutting edge from the other side and hones the blade, removing burrs for example.

The context of the present disclosure also includes a slicing system comprising a slicer for slicing off slices from in particular a length of material to be sliced, preferably food, comprising a slicer housing, which retains a drive motor and a rotating circular blade that is driven by the drive motor, a cutting edge of the circular blade being covered in a first portion by a blade guard ring, the slicer comprising a stop plate and a displaceably arranged carriage, by means of which the material to be sliced is fed to the circular blade, the stop plate being movable in the direction of the axis of rotation of the circular blade, the slicing system having a whetting device for whetting the circular blade, the whetting device having a whetstone for sharpening the circular blade and a hone for deburring the circular blade, the whetting device having a handle for moving the whetstone and/or the hone toward the circular blade.

According to an aspect of the present disclosure, this slicing system is characterized in that the whetting device has a mount for being fastened to the stop plate, the mount having an insertion apparatus for being form-fittingly inserted into the stop plate, the mount having an in particular U-shaped plate receptacle which has a gap for introducing the stop plate into the gap when the whetting device is pushed onto the stop plate, and in that the insertion apparatus has at least one lug, preferably two lugs, for engaging in an associated recess in the stop plate or in that the stop plate has at least one lug, preferably two lugs, for engaging in an associated recess in the insertion apparatus.

Due to the way in which they are positioned, the whetting devices of slicing systems of this kind can be used for a multiplicity of slicers, in particular those of the same type. The stop plates are generally positioned to a high degree of accuracy in relation to the circular blade, this positioning in particular being the same for many different slicers. By being fastened to the stop plate, therefore, the whetting device fastened to the stop plate is also arranged with little or no tolerance in relation to the circular blade. In this way, the positioning and the alignment of the whetting device relative to the circular blade is in particular the same in many different slicers. As a result, one whetting device having precise positioning can be used for different slicers.

One category of advantageous embodiments of the whetting device according to the present disclosure is characterized in that the at least one lug is in particular configured for engaging in a recess on a rear face of the stop plate, and the rear face of the stop plate facing away from a carriage of the slicer in the direction of the axis of rotation of the circular blade. In this embodiment, the whetting device in particular abuts the stop-plate front face facing the carriage so as to whet the circular blade, and is also fastened to the rear face of the stop plate by means of the lug. In the process, the mount engages around the stop-plate edge that is at the top when the stop plate is in the mounted state. By being arranged on both faces of the stop plate, the whetting device is held in position on the stop plate in a particularly stable manner.

Also advantageous are embodiments of the whetting device according to the present disclosure in which the mount for fastening the whetting device to a stop plate of the slicer has a threaded spindle for clamping the stop plate. Owing to the threaded spindle, the stop plate can be connected to the whetting device in a stable but manually releasable manner. In particular, the threaded spindle is located on one side of the gap of the U-shaped plate receptacle, so as to press the stop plate against the opposite side of the U-shaped plate receptacle and thus firmly clamp the whetting device on the stop plate.

Also advantageous are embodiments of the whetting device that are characterized in that the insertion apparatus is formed on the inner surface of the gap of the plate receptacle. In particular, the stop plate is guided along the inner surface of the gap when inserted into the gap. The insertion apparatus is in particular formed on the inner surface of the gap in the form of the aforementioned lugs. Whereas the plate receptacle engages around the stop plate during insertion so as to prevent the whetting device being displaced in the direction of the axis of rotation of the circular blade, the insertion apparatus on the inner surface of the gap prevents the whetting device being displaced along the stop plate as early as when the stop plate is inserted.

In further configurations of the whetting device, the insertion apparatus has a tapering shape, in particular a U shape, in a direction of the insertion. As a result, the insertion apparatus is centered when inserted into the receptacle in the stop plate, thereby simplifying insertion.

A further embodiment of the whetting device is characterized in that a receptacle of the whetting device is present for form-fittingly engaging around an end of a blade guard ring of the slicer, the receptacle being configured to engage around the end of the blade guard ring when the stop plate is at least at a predetermined distance from the circular blade in the direction of an axis of rotation of the circular blade, and not to engage around the end of the blade guard ring when the distance between the stop plate and the blade guard ring is shorter than the predetermined distance in the direction of the axis of rotation of the circular blade.

Consequently, a risk of injury when the whetting device is being mounted and removed, and poor hygiene when the whetting device is in use, are avoided. When the distance between the stop plate and the blade guard ring is shorter than the predetermined distance in the direction of the axis of rotation of the circular blade, i.e., in particular when the stop plate is in a closed position, the receptacle does not engage around the end of the blade guard ring.

The whetting device can then be fastened to the stop plate by means of the mount, or can be detached from the stop plate. In the closed position, the circular blade covered by the stop plate and the blade guard ring cannot be touched, so there is no risk of injury. As a result, the whetting device can advantageously be fitted on the stop plate as early as when it is still in the closed position and the slicer still poses no injury risk. To ensure user safety during whetting, the whetting device is mounted on the slicer as early as when the slicer is in the safe state, i.e., when the slicing blade is completely covered. When in the closed position, the stop plate in particular covers a portion of the slicing-blade cutting edge that is not covered by the blade guard ring.

Once the whetting device has been mounted, with the stop plate in the closed position, the stop plate is displaced out of the closed position in order to whet the circular blade, such that the stop plate is at least at a predetermined distance from the circular blade in the direction of an axis of rotation of the circular blade, i.e., the stop plate is in an open position. The whetting device is thus brought close to the now-accessible cutting edge of the circular blade. When the stop plate is displaced, the end of the blade guard ring is introduced into the receptacle in the direction of the axis of rotation of the circular blade, which receptacle engages around the end of the blade guard ring when the stop plate is in the open position. In the process, the receptacle in particular has a guide for introducing the blade guard ring.

When the stop plate is open, the whetting device interacts with the blade guard ring. Together with the whetting-device insertion apparatus, which is inserted into the stop plate, when the stop plate is in the open position the receptacle prevents the whetting device from being able to be demounted during whetting of the circular blade, which poses the risk of the user cutting themselves. In particular, when the stop plate is open, the whetting device cannot be demounted either in a direction along the stop plate or perpendicularly to that direction. By means of the receptacle in the whetting device for the blade guard ring, the blade guard ring secures the whetting device when the stop plate is open, but not when the stop plate is closed.

The blade guard ring is preferably C-shaped so as to cover the circular blade.

A development of the aforementioned embodiment of the whetting device according to the present disclosure is characterized in that the receptacle is formed as a cut-out for introducing the end of the blade guard ring. The receptacle engages around the end of the blade guard ring, thereby providing a secure hold for the whetting device on the end of the blade guard ring. Forming the receptacle as a cut-out is also particularly material-efficient.

In an advantageous configuration, the whetting device has a frame for covering at least one portion of a cutting edge of the circular blade and for pivoting the whetting device from an installation position into a working position. The frame reduces the risk of a user cutting themselves on the circular blade. In particular, the whetting device is mounted on the slicer in the installation position whereas the working position of the whetting device is used for the whetting of the circular blade by the whetting device.

In a development of the aforementioned configuration, the frame of the whetting device comprises cover plates for covering the cutting edge of the circular blade, the whetstone and the hone in particular being arranged between the cover plates. Due to their extent, the cover plates protect users against cutting themselves on the cutting edge of the circular blade while the stop plate is in motion. The cover plates, the whetstone, and the hone are in particular arranged in the circumferential direction of the circular blade, the whetstone and the hone being positioned between the cover plates.

Further embodiments of the whetting device according to the present disclosure are characterized by a latching mechanism for locking the whetting device in the working position and/or in the installation position. As a result, the whetting device is held in each position in a stable but manually releasable manner. By way of example, the latching mechanism is formed by a latching pin and resilient elements on the whetting device.

A preferred variant of the whetting device according to the present disclosure is characterized by a pivot mechanism for pivoting the whetting device from the working position into the installation position. Preferably, the pivot mechanism has a guide groove and/or a guide rail for guiding the whetting device during pivoting, and/or a rotating pin about which the whetting device can pivot in its entirety or in part. Particularly preferably, the aforementioned latching pin engages in the guide groove and/or is guided along the guide rail, whereby the whetting device can be pivoted between the latching positions from the working position into the installation position.

A development of the aforementioned variant is characterized by a stop for the pivot mechanism. The stop brakes the pivoting in a stable manner and acts as a buffer to protect the whetting device from mechanical damage resulting from the pivoting.

A further preferred embodiment of the whetting device according to the present disclosure is characterized in that the handle for moving the whetstone and/or the hone toward the circular blade of the slicer is formed as a wheel of the frame of the whetting device, the wheel being configured, when turned, to move the whetstone and/or the hone relative to the circular blade, such that they can be arranged on the circular blade and/or moved away from the circular blade. Owing to the wheel and a rotary mechanism connected thereto, the whetstone and/or the hone can be shifted in a space-saving manner.

An advantageous configuration of the above-described slicing system according to the present disclosure is characterized in that the recess is preferably formed on a rear face of the stop plate, the rear face facing away from a carriage of the slicer in the direction of the axis of rotation of the circular blade. In this embodiment, the whetting device in particular abuts both faces of the stop plate and is thus held in position on the stop plate in a particularly stable manner.

Further advantages of the present disclosure become apparent from the description and the drawings. According to the present disclosure, the aforementioned features and those yet to be stated can likewise each be used either in isolation or together in any combinations. The embodiments shown and described should not be taken to be an exhaustive list, but rather are intended as examples for outlining the present disclosure.

The present disclosure concerns a whetting device for a slicer for slicing off slices from in particular a length of material to be sliced, preferably food.

Figure 1B:
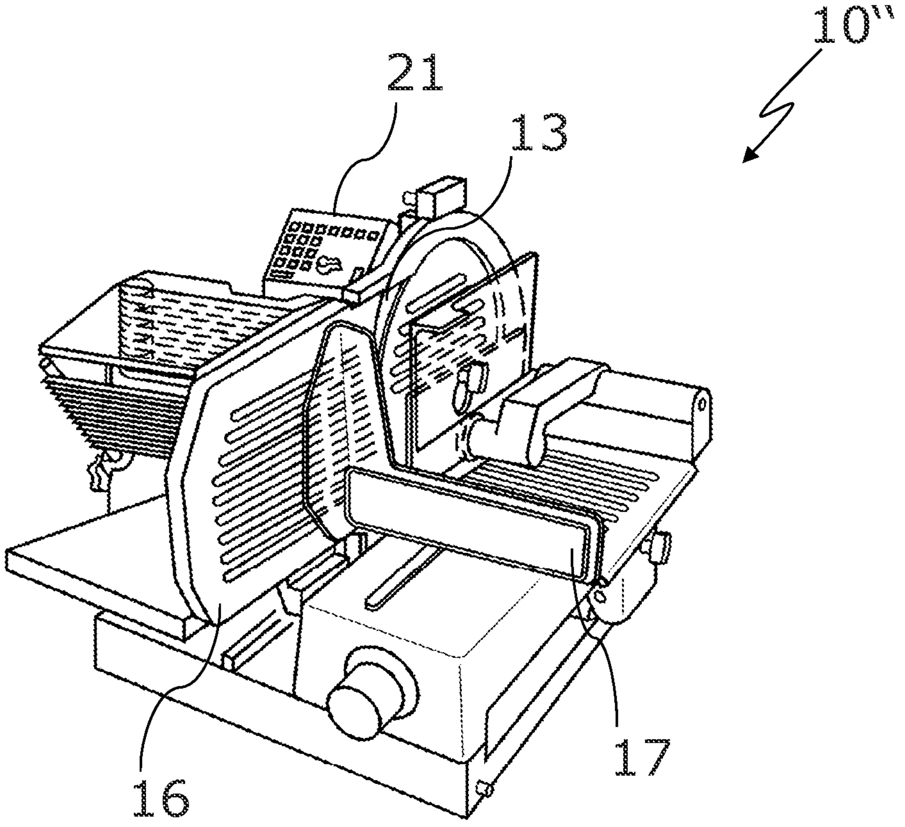
FIG. 1*b* is a three-dimensional view of a slicer configured as a vertical slicing machine.
Figure 2A:
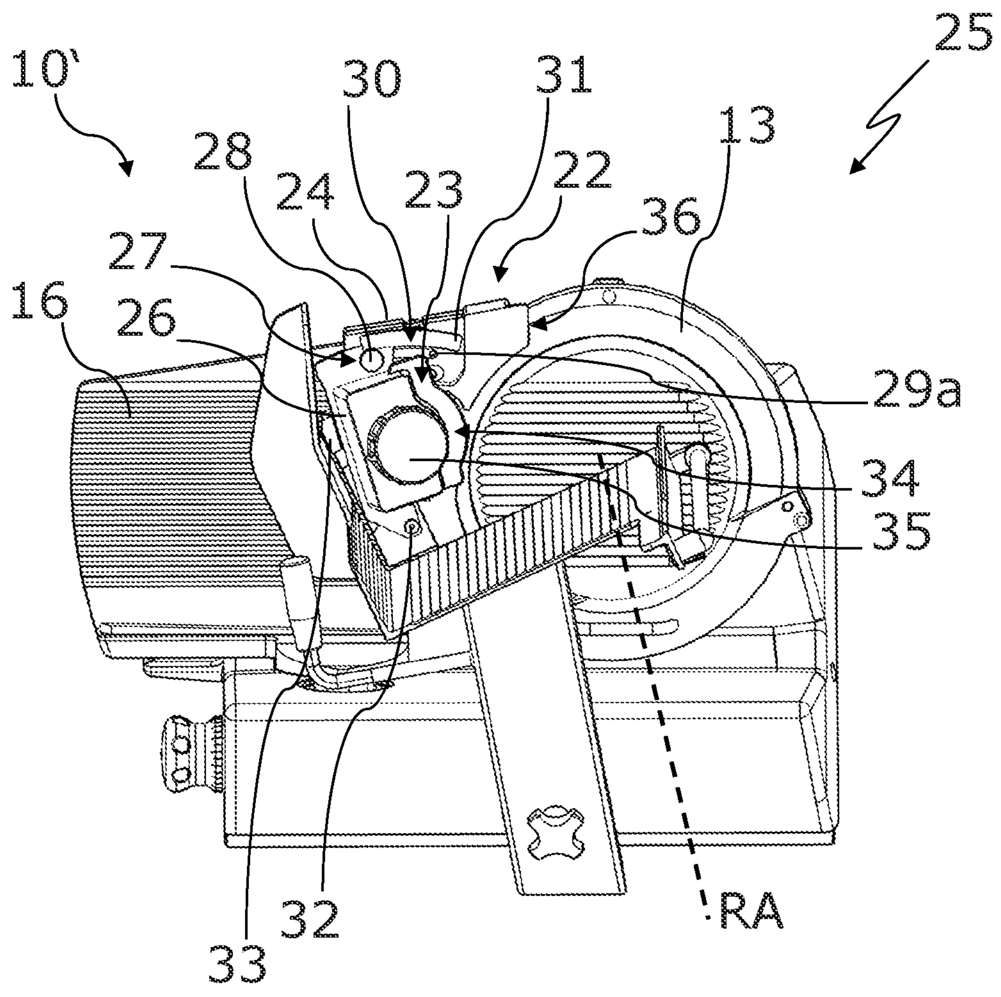
FIG. 2*a* is a side view of a slicing system comprising a slicer and a whetting device in an installation position.
Figure 2B:
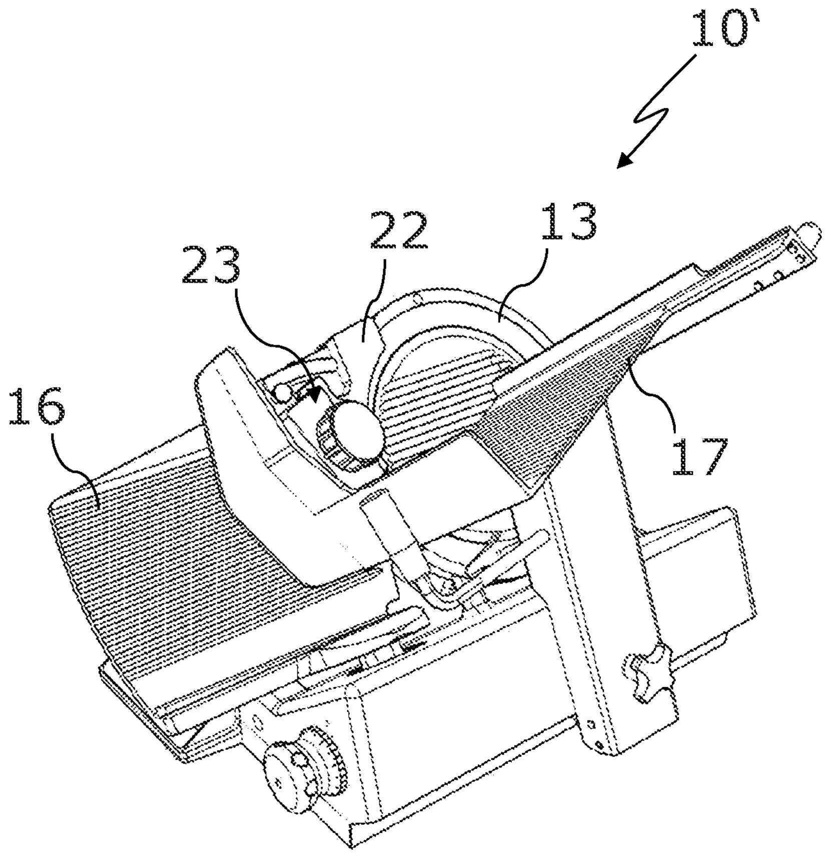
FIG. 2*b* is a view of the slicing system according to FIG. 2*a* obliquely from above.
Figure 2C:
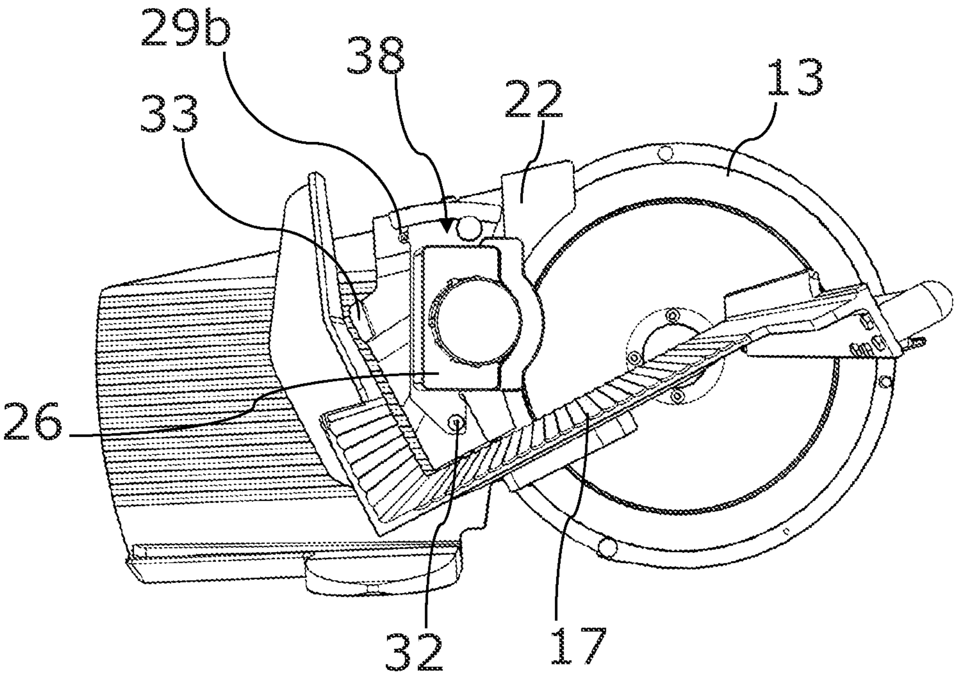
FIG. 2*c* is a side view of a part of the slicing system according to FIG. 2*a*, with the whetting device in a working position.

FIGS. 1*a* and 1*b* are isometric views of a slicer configured as a gravity feed slicing machine and a vertical slicing machine, respectively. FIGS. 2*a* to 2*c* show a whetting device according to an aspect of the present disclosure in an installation position and a working position on the gravity feed slicing machine. FIGS. 3*a* to 4*d* are various views of the whetting device. FIG. 5 shows a stop plate of the slicer, comprising recesses for receiving lugs of the whetting device.

FIG. 1*a* shows a slicer 10' which is configured as a gravity feed slicing machine and on which a whetting device 22 according to an aspect of the present disclosure (cf. FIG. 2*a*) can be fitted. The slicer 10' comprises a slicing apparatus 11 in a slicer housing 12. The slicing apparatus 11 has a rotatably mounted circular blade 13. In this case, a cutting edge 14 of the circular blade 13 is covered in a first portion by a blade guard ring 15.

The slicer 10' further comprises a stop plate 16 and a displaceably arranged carriage 17, by means of which material to be sliced is fed to the circular blade 13. In the process, the stop plate 16 can be moved in the direction of the axis of rotation RA (see FIG. 2*a*) of the circular blade 13. In FIG. 1*a*, the stop plate 16 is in an open position 18, at a distance from the circular blade 13 in the direction of the axis of rotation RA of the circular blade 13. The cutting edge 14 of the circular blade 13 is freely accessible. A blade cover 19 is used for protection against the circular blade 13 along its inner circumference. The blade guard ring 15 has an end 20 which is formed as a projection and introduced into a receptacle 43 in a whetting device 22 (see FIG. 4*a*). FIG. 1*a* also shows elongate cavities 53*a*, 53*b* on the front face of the stop plate 16 facing the carriage 17, for associated protrusions 52*a*, 52*b* on the whetting device 22 (see FIG. 4*c*). When the elongate cavities 53*a*, 53*b* receive the protrusions 52, 52*b*, the cavities do not create a form fit with the protrusions. In particular, the protrusions 52*a*, 52*b* can be circular in cross section, as shown in the embodiment of FIG. 4*c*.

As an alternative to a gravity feed slicing machine 10' according to FIG. 1*a*, FIG. 1*b* shows a slicer 10" configured as a vertical slicing machine, comprising the carriage 17, the stop plate 16, and the rotationally mounted circular blade 13 on which the whetting device 22 can likewise be mounted. The vertical slicer 10" is controlled by way of an instrument panel 21.

To whet the circular blade 13, which is mounted so as to be rotatable about the axis of rotation RA, the whetting device 22 is used, which is mounted in an installation position 23 (shown in FIG. 2*a*) on the stop plate 16 of a slicer 10', as shown in FIG. 1*a*, in the open position (cf. FIG. 1*a*), by way of a mount 24. The whetting device 22 and the slicer 10' together form a slicing system 25.

In particular, the installation position 23 can be recognized in that a housing 26 for protecting the operating mechanism of the whetting device 22 is pivoted away from the circular blade 13, whereas in a working position (see FIG. 2*c*) the housing 26 is pivoted toward the circular blade 13. A latching mechanism 27 comprising a latching pin 28 locks the whetting device 22 in the installation position 23. The latching mechanism 27 is also used for locking the whetting device 22 in a working position (see FIG. 2*c*) by way of a first latching receptacle 29*a*.

The pivoting from the working position into the installation position 23 is carried out by means of a pivot mechanism 30. The pivot mechanism 30 has a guide 31 for guiding the whetting device 22 during the pivoting. The housing 26 is pivoted about a rotating pin 32 of the pivot mechanism. The pivoting motion of the whetting device 22 toward the installation position 23 is stopped by a stop 33 acting as a buffer.

The whetting device 22 has a handle 34 for moving a whetstone 39 and a hone 40 (see FIG. 4*a*) toward the circular blade 13 of the slicer 10. The handle 34 is formed as a wheel 35 which, when turned, moves the whetstone 39 and the hone 40 toward the circular blade 13 or away from the circular blade 13. The whetting device 22 comprises a frame 36, which bears the above-described components.

By comparison with FIG. 1*a*, FIG. 2*b* shows the gravity feed slicing machine 10' comprising the carriage 17, the stop plate 16, and the circular blade 13, although now the whetting device 22 is mounted on the stop plate 16 in the installation position 23.

To whet the circular blade 13, the whetting device 22 assumes a working position 38, which is shown in FIG. 2*c*. Compared with the installation position 23 (see FIG. 2*a*), the housing 26 is pivoted toward the circular blade 13 and spaced apart from the stop 33. In the process, the housing 26 has been pivoted about the rotating pin 32 from the installation position 23 into the working position 38. The carriage 17 cannot be moved over the entire carriage stroke, otherwise it might collide with the whetting device 22 while it is in motion. In the carriage position shown, the carriage 17 covers a lower part of the cutting edge 14 of the circular blade 13. To protect a user, a part of the circular blade 13 is additionally covered by the carriage 17. A second latching receptacle 29*b* is used to lock the whetting device 22 in the installation position 23 (see FIG. 2*a*).

Figure 3A:
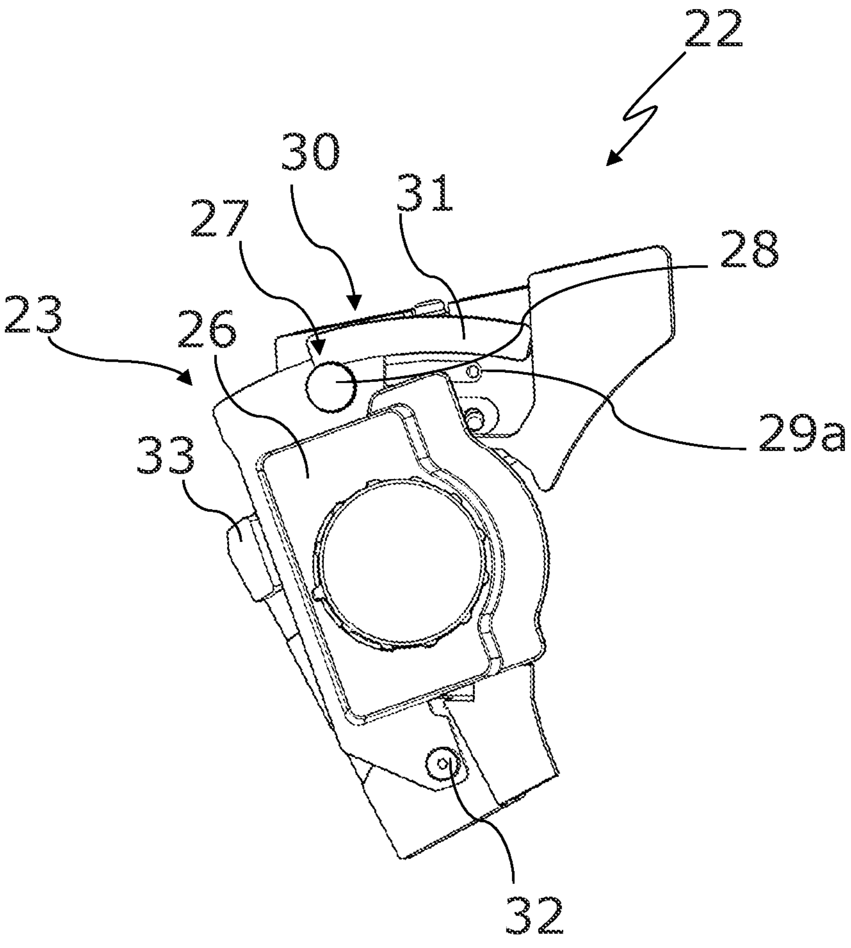
FIG. 3*a* is a side view of an embodiment of the whetting device according to the invention in the installation position.

FIG. 3*a* is a side view of the whetting device 22 in the installation position 23. The housing 26 of the whetting device 22 is abutting the stop 33. The latching mechanism 27 comprising the latching pin 28 locks the whetting device 22 in the installation position 23. Also shown is the pivot mechanism 30 comprising the guide 31 and the rotating pin 32. The first latching receptacle 29*a* is also shown.

Figure 3B:
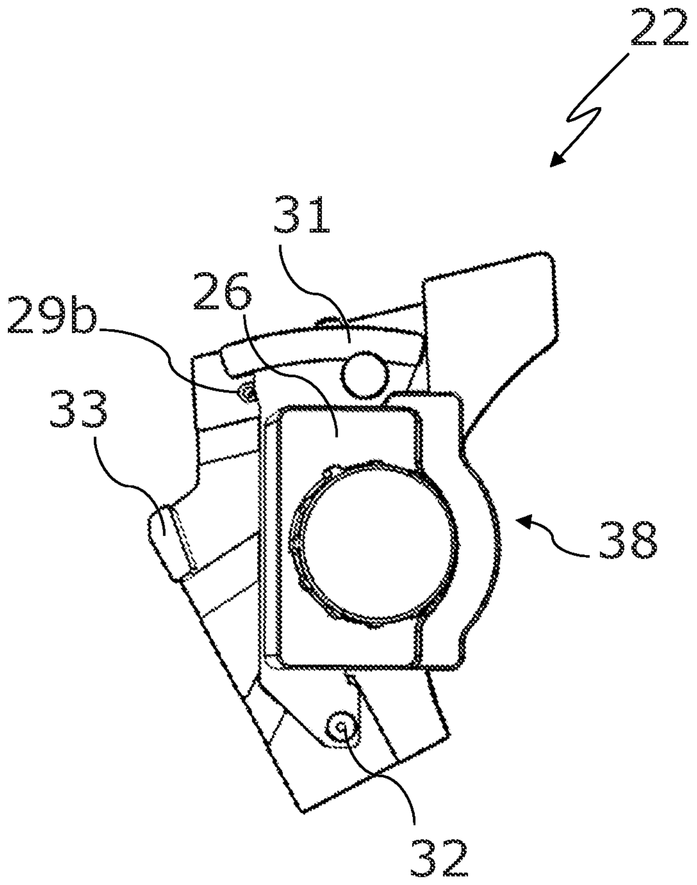
FIG. 3*b* is a side view of the whetting device according to FIG. 3*a* in the working position.

FIG. 3*b* is a side view of the whetting device 22 in the working position 38. The housing 26 is pivoted about the rotating pin 32 along the guide 31 and spaced apart from the stop 33. The second latching receptacle 29*b* is also shown.

Figure 4A:
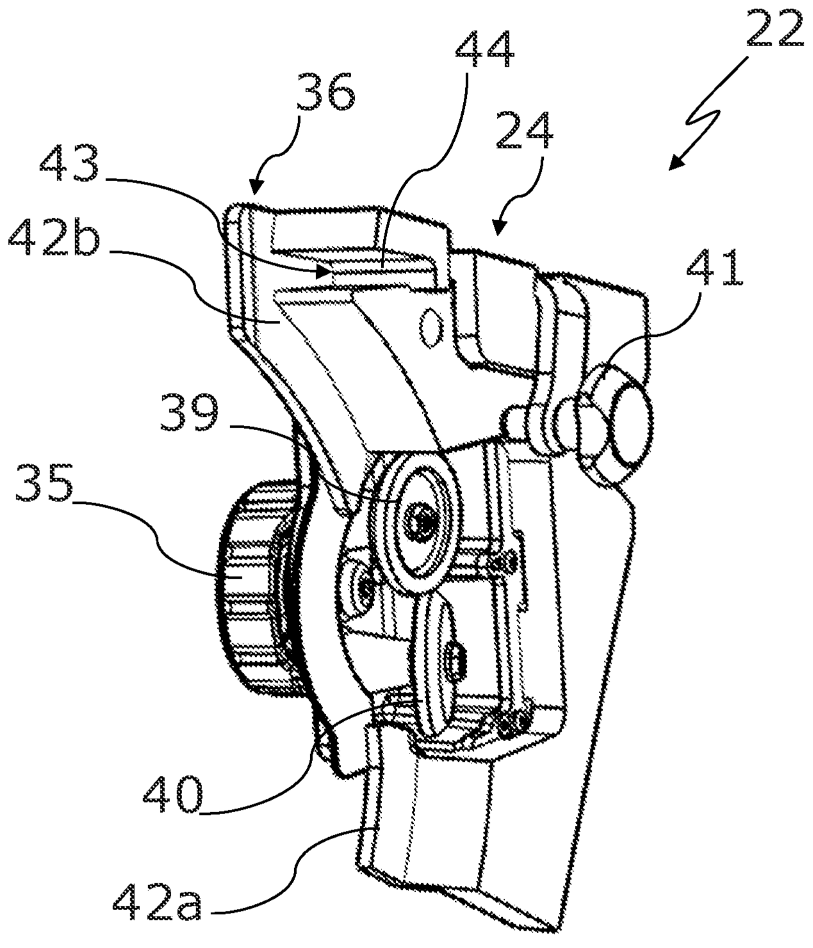
FIG. 4*a* is an internal view of the whetting device from a side that faces a circular blade of the slicer when the whetting device is in the mounted state.
Figure 4B:
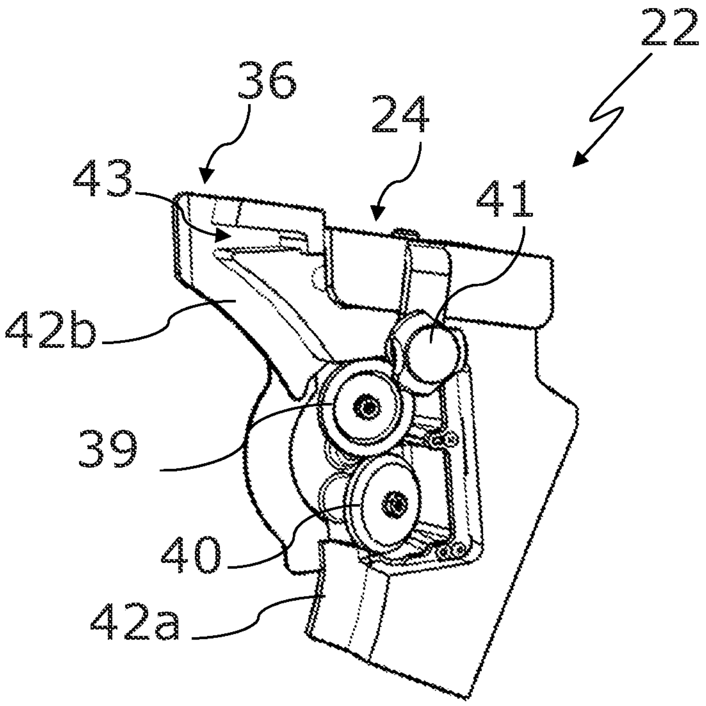
FIG. 4*b* is an internal view of the whetting device from a side on which a mount of the whetting device is located.
Figure 4C:
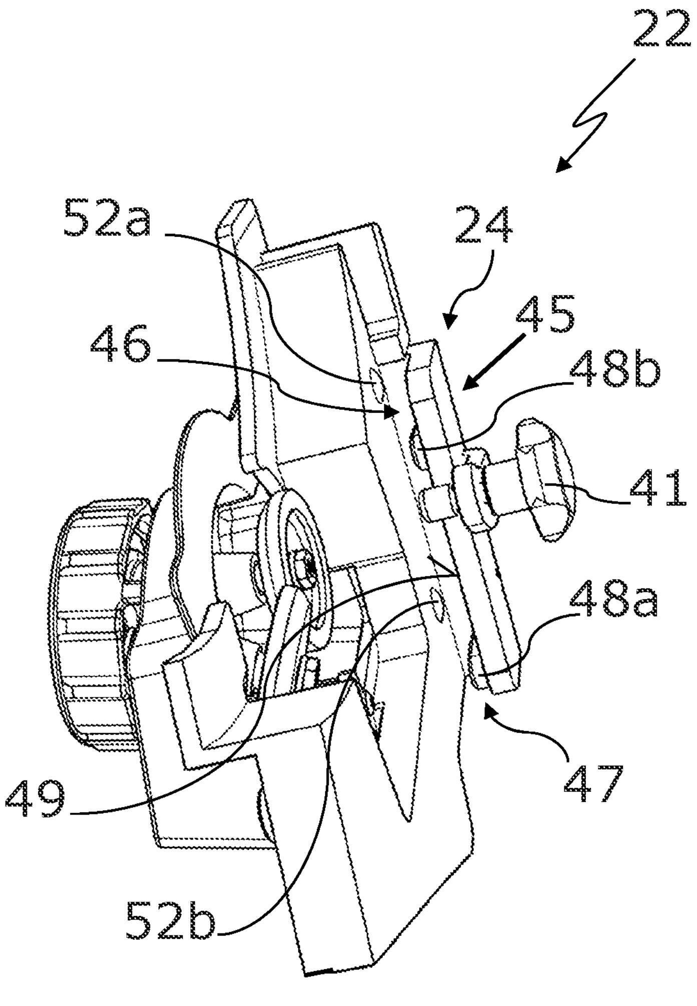
FIG. 4*c* is an internal view of the whetting device from a side located at the bottom when the whetting device is in the mounted state.
Figure 4D:
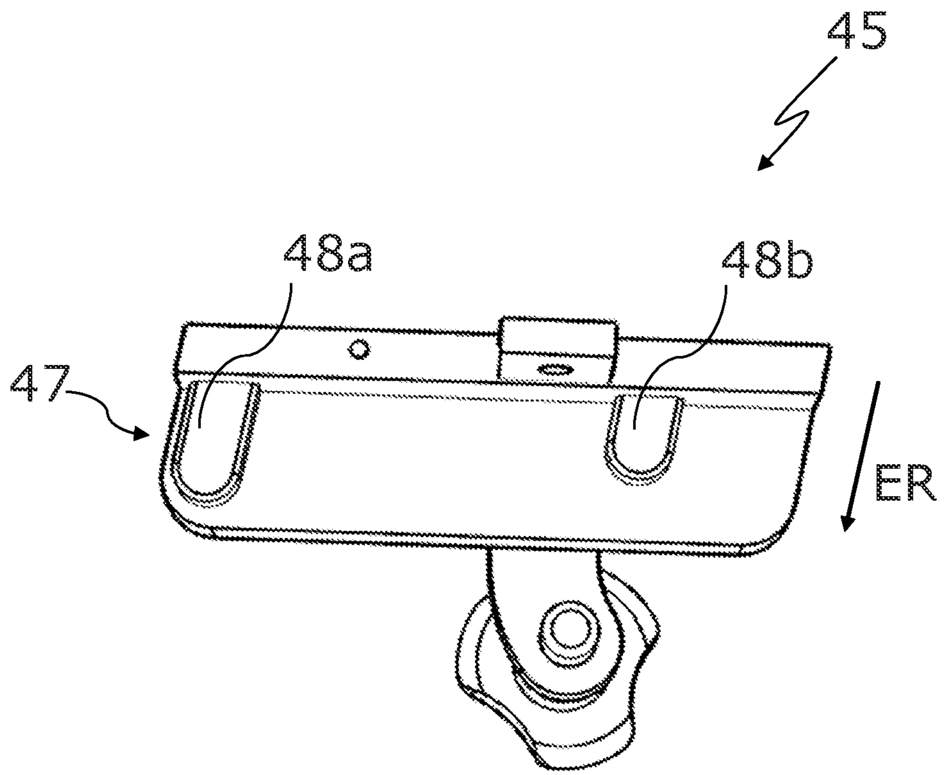
FIG. 4*d* is a view of a mount of the whetting device, comprising an insertion apparatus.
Figure 5:
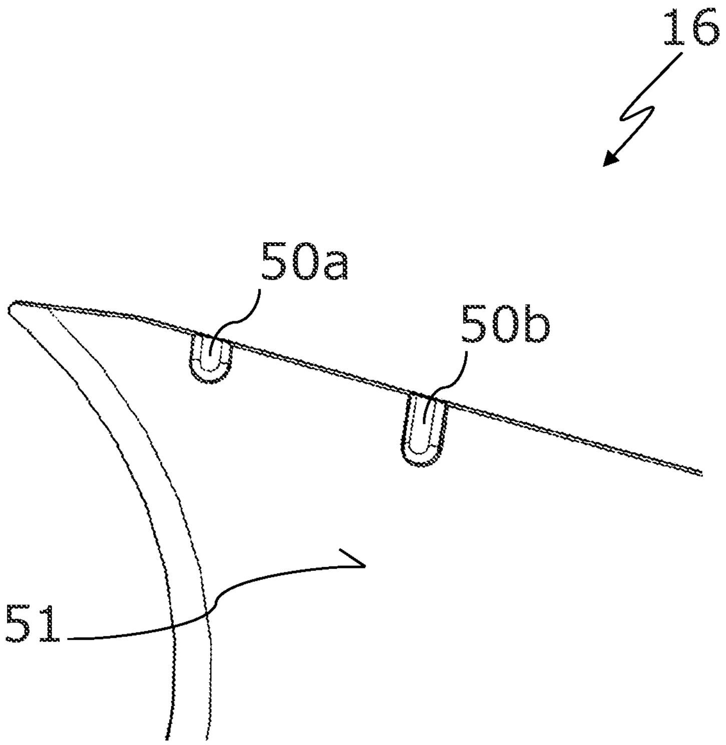
FIG. 5 is a schematic three-dimensional view of the rear face of a stop plate.

The whetting device 22 has the whetstone 39 for sharpening the circular blade 13 (see FIG. 2*a*) and the hone 40 for deburring the circular blade 13, which are shown in FIG. 4*a* and FIG. 4*b*. The whetstone 39 and the hone 40 are moved toward the circular blade 13 by means of the wheel 35 (see FIG. 2*a*). A threaded spindle 41 for clamping the stop plate 16 is located on the mount 24 (see FIG. 2*b*). The frame 36 of the whetting device 22 comprises cover plates 42*a*, 42*b* for covering the circular blade 13. The whetstone 39 and the hone 40 are arranged in the circumferential direction of the circular blade 13 between the cover plates 42*a*, 42*b* of the frame 36.

The receptacle 43 in the whetting device 22 is configured to form-fittingly engage around the end 20, which is formed as a projection, of the blade guard ring 15 (see FIG. 1*a*) when the stop plate 16 is at a predetermined distance from the circular blade 13 in the direction of the axis of rotation RA of the circular blade 13 (see FIG. 1*b*). The receptacle 43 does not engage around the end 20 of the blade guard ring 15 when the distance between the stop plate 16 and the blade guard ring 15 is shorter than the predetermined distance in the direction of the axis of rotation RA of the circular blade 13. The receptacle 43 is configured as a cut-out 44 in the whetting device 22 for introducing the end 20 of the blade guard ring 15.

The mount 24 for fastening the whetting device 22 to the stop plate 16 (see FIG. 2*a*) has an in particular U-shaped plate receptacle 45 (shown in FIG. 4*c*) having a gap 46 for introducing the stop plate 16 into the gap 46 when the whetting device 22 is pushed onto the stop plate 16. The threaded spindle 41 is located at the gap 46 of the plate receptacle 45. Protrusions 52*a*, 52*b* on the mount 24 engage in associated recesses 53*a*, 53*b* on the front face of the stop plate 16 (see FIG. 1*a*). The mount 24 of the whetting device 22 also has an insertion apparatus 47 for being form-fittingly inserted into the stop plate 16. The insertion apparatus 47 comprises two lugs 48*a*, 48*b*, which engage, in particular form-fittingly, in associated recesses on a rear face of the stop plate 16 (see FIG. 5). The insertion apparatus 47 having the lugs 48*a*, 48*b* is formed on an inner surface 49 of the gap 46 of the plate receptacle 45, on which inner surface the stop plate 16 is arranged when the whetting device 22 is in the mounted state. The lugs 48*a*, 48*b* have a tapering U shape in the direction of the insertion ER of the insertion apparatus 47, as shown in detail in FIG. 4*d*.

Two recesses 50*a*, 50*b* in the stop plate 16 (which are shown in FIG. 5) form-fittingly receive the lugs 48*a*, 48*b* of the insertion apparatus (see FIG. 3*c*). The recesses 50*a*, 50*b* are preferably formed on a rear face 51 of the stop plate 16, the rear face facing away from the carriage 17 of the slicer 10' in the direction of the axis of rotation RA of the circular blade 13 (see FIG. 2*a*).

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

10' Gravity feed slicing machine
10" Vertical slicing machine
11 Slicing apparatus
12 Slicer housing
13 Circular blade
14 Cutting edge
15 Blade guard ring
16 Stop plate
17 Carriage
18 Open position of the stop plate
19 Blade cover
20 End of the blade guard ring
21 Instrument panel
22 Whetting device
23 Installation position
24 Mount
25 Slicing system
26 Housing
27 Latching mechanism
28 Latching pin
29*a, b* Latching receptacles
30 Pivot mechanism
31 Guide
32 Rotating pin
33 Stop
34 Handle
35 Wheel
36 Frame
38 Working position
39 Whetstone
40 Hone

41 Threaded spindle
42*a, b* Cover plates
43 Receptacle
44 Cut-out
45 Plate receptacle
46 Gap
47 Insertion apparatus
48*a*, 48*b* Lugs
49 Inner surface of the gap
50*a, b* Recesses
51 Rear face of the stop plate
52*a, b* Protrusions
53*a, b* Cut-outs
RA Axis of rotation
ER Insertion direction

The invention claimed is:

1. A whetting device for a slicer for slicing off slices from a length of material to be sliced, the whetting device comprising:
- a whetstone configured to sharpen a rotating circular blade of the slicer;
- a hone configured to deburr the circular blade;
- a handle configured to move the whetstone or the hone toward the circular blade; and
- a mount configured to be fastened to a stop plate of the slicer having an insertion apparatus configured to be form-fittingly inserted into the stop plate, the mount having a U-shaped plate receptacle, which has a gap for introducing the stop plate into the gap in a state where the whetting device is pushed onto the stop plate,
- wherein:
  - the insertion apparatus comprises at least one lug configured to engage in an associated recess in the stop plate, the at least one lug being integral with and protruding from a face of the mount,
- wherein the at least one lug is secured by being inserted into the associated recess, the associated recess thereby forming at least one form-fitting receptacle for the at least one lug preventing the whetting device from being displaced along the stop plate,
- wherein the at least one lug has a width, which extends perpendicular to a direction of insertion, a length, which extends with the direction of insertion, a height extending away from the face of the mount, a top face extending in a plane parallel to the face of the mount, and a side wall extending around a periphery of the at least one lug, the side wall connecting the top face to the face of the mount, and
- wherein a leading portion of the side wall in the direction of insertion is U shaped.

2. The whetting device according to claim 1, wherein the at least one lug is configured to engage in the associated recess on a rear face of the stop plate, the rear face of the stop plate facing away from a carriage of the slicer in a direction of an axis of rotation of the circular blade.

3. The whetting device according to claim 1, wherein the mount for fastening the whetting device to the stop plate of the slicer has a threaded spindle for clamping the stop plate.

4. The whetting device according to claim 1, wherein the insertion apparatus is on an inner surface of the gap of the plate receptacle.

5. The whetting device according to claim 1, wherein a top face of the at least one lug has a tapering shape in the direction of the insertion.

6. The whetting device according to claim 1,
- wherein a receptacle of the whetting device is configured for form-fittingly engaging around an end of a blade guard ring of the slicer, the receptacle being configured to engage around the end of the blade guard ring in a state when the stop plate is at least at a predetermined distance from the circular blade in a direction of an axis of rotation of the circular blade, and not to engage around the end of the blade guard ring in a state when a distance between the stop plate and the blade guard ring is shorter than the predetermined distance in the direction of the axis of rotation of the circular blade.

7. The whetting device according to claim 6, wherein the receptacle is a cut-out configured for introducing the end of the blade guard ring.

8. The whetting device according to claim 1, wherein the whetting device comprises a frame configured to cover at least one portion of a cutting edge of the circular blade and configured to pivot the whetting device from an installation position into a working position.

9. The whetting device according to claim 8, wherein the frame of the whetting device comprises cover plates configured to cover the cutting edge of the circular blade, the whetstone and the hone being arranged between the cover plates.

10. The whetting device according to claim 1, comprising a latch configured to lock the whetting device in the working position or in the installation position.

11. The whetting device according to claim 1, comprising a pivot mechanism configured to pivot the whetting device from a working position into an installation position.

12. The whetting device according to claim 11, comprising a stop for the pivot mechanism.

13. The whetting device according to claim 1, wherein the handle for moving the whetstone or the hone toward the circular blade of the slicer is a wheel of the frame of the whetting device, the wheel being configured, when turned, to move the whetstone or the hone toward the circular blade, such that the whetstone or the hone is capable of being arranged on the circular blade, or to move the whetstone or the hone away from the circular blade.

14. The whetting device according to claim 1, wherein the at least one lug protrudes from an inner surface of the insertion apparatus into the gap, or protrudes from a rear surface of the stop plate.

15. The whetting device according to claim 14, wherein the top face of the at least one lug has a tapering U shape in the direction of insertion.

16. The whetting device according to claim 1, wherein the at least one lug is at least two lugs, each of the lugs being integrally formed as protrusions from a surface and having the respective top face having a tapering U-shape in the direction of insertion, the length between the at least two lugs differing from each other.

17. The whetting device according to claim 1,
- wherein the associated recess is formed as indent in the face of the mount and has a top face extending in a plane parallel to the face of the mount.

18. A slicing system, the slicer system comprising:
- a slicer for slicing off slices from a length of material to be sliced, the slicer comprising:
  - a slicer housing, which retains a drive motor and a rotating circular blade that is configured to be driven by the drive motor, a cutting edge of the circular blade being covered in a first portion by a blade guard ring; and
  - a stop plate and a displaceably arranged carriage, which is configured to feed the material to be sliced to the circular blade, the stop plate being movable in the direction of the axis of rotation of the circular blade;

a whetting device configured to whet the circular blade, the whetting device comprising:

a whetstone configured to sharpen the circular blade; and a hone configured to deburr the circular blade;

a handle configured to move the whetstone or the hone toward the circular blade;

a mount configured to be fastened to the stop plate, the mount comprising an insertion apparatus configured to be form-fittingly inserted into the stop plate, the mount having a U-shaped plate receptacle which has a gap for introducing the stop plate into the gap in a state where the whetting device is pushed onto the stop plate, wherein:

the insertion apparatus comprises at least one lug, configured to engage in an associated recess in the stop plate, the at least one lug being integral with and protruding from a face of the mount, or the stop plate comprises the at least one lug, configured to engage in an associated recess in the insertion apparatus, the at least one lug being integral with and protruding from a face of the stop plate, wherein the at least one lug is secured by being inserted into the associated recess, the associated recess thereby forming at least one form-fitting receptacle for the at least one lug preventing the whetting device from being displaced along the stop plate, and wherein the at least one lug has a width, which extends perpendicular to a direction of insertion, a length, which extends with the direction of insertion, a height extending away from the face of the stop plate or the face of the mount, a top face extending in a plane parallel to the face of the stop plate or the face of the mount, and a side wall extending around the periphery of the at least one lug, the sidewall connecting the top face to the face of the stop plate or the face of the mount, wherein a leading portion of the side wall in the direction of insertion is U shaped.

19. A whetting device for a slicer for slicing off slices from a length of material to be sliced, the whetting device comprising:

a whetstone configured to sharpen a rotating circular blade of the slicer;

a hone configured to deburr the circular blade;

a handle configured to move the whetstone or the hone toward the circular blade; and a mount configured to be fastened to a stop plate of the slicer having an insertion apparatus configured to be form-fittingly inserted into the stop plate, the mount having a U-shaped plate receptacle, which has a gap for introducing the stop plate into the gap in a state where the whetting device is pushed onto the stop plate, wherein:

the insertion apparatus comprises at least one lug configured to engage in an associated recess in the stop plate, and wherein the at least one lug is secured by being inserted into the associated recess, the associated recess thereby forming at least one form-fitting receptacle for the at least one lug preventing the whetting device from being displaced along the stop plate, and wherein a receptacle of the whetting device is configured for form-fittingly engaging around an end of a blade guard ring of the slicer, the receptacle being configured to engage around the end of the blade guard ring in a state when the stop plate is at least at a predetermined distance from the circular blade in a direction of an axis of rotation of the circular blade, and not to engage around the end of the blade guard ring in a state when a distance between the stop plate and the blade guard ring is shorter than the predetermined distance in the direction of the axis of rotation of the circular blade.

20. The whetting device according to claim 19, wherein the receptacle is a cut-out configured for introducing the end of the blade guard ring.

* * * * *